United States Patent
Bausenwein et al.

(10) Patent No.: US 7,817,329 B2
(45) Date of Patent: Oct. 19, 2010

(54) 2-CHANNEL DISPLAY SYSTEM COMPRISING MICRO ELECTRO MECHANICAL SYSTEMS

(76) Inventors: Bernhard Rudolf Bausenwein, Eichenstrasse 32, Hagelstadt, Bavaria (DE) D-93095; Max Mayer, Hutstr. 39, Forchheim, Bavaria (DE) 91301

(*) Notice: Subject to any disclaimer, the term of this patent is extended or adjusted under 35 U.S.C. 154(b) by 494 days.

(21) Appl. No.: 12/000,467

(22) Filed: Dec. 13, 2007

(65) Prior Publication Data

US 2008/0096598 A1  Apr. 24, 2008

Related U.S. Application Data

(62) Division of application No. 11/017,916, filed on Dec. 20, 2004, now Pat. No. 7,440,768.

(30) Foreign Application Priority Data

Dec. 29, 2003  (DE)  ................................. 103 61 915

(51) Int. Cl.
*G02B 26/00* (2006.01)
*G02B 26/08* (2006.01)
*G02B 27/10* (2006.01)
*G02F 1/29* (2006.01)

(52) U.S. Cl. ................ 359/290; 359/291; 359/292; 359/298; 359/618

(58) Field of Classification Search ......... 359/290–292, 359/298, 283, 242, 251, 267, 618, 629, 639
See application file for complete search history.

(56) References Cited

U.S. PATENT DOCUMENTS

| | | | |
|---|---|---|---|
| 5,600,383 A | 2/1997 | Hornbeck | |
| 5,638,142 A | 6/1997 | Kavanagh et al. | |
| 5,921,650 A | 7/1999 | Doany et al. | |
| 6,250,763 B1 | 6/2001 | Fielding et al. | |

FOREIGN PATENT DOCUMENTS

WO  WO 01/37029  5/2001

*Primary Examiner*—Ricky L Mack
*Assistant Examiner*—Brandi N Thomas

(57) ABSTRACT

The 2-channel display system with micro electromechanical systems (MEMS, e.g. DMDs from Texas Instruments) simultaneously generates a right and a left image in two discrete modulation channels, which differ by the polarization of their light beams. More specifically, the invention relates to the chirality (handedness) of MEMS and the geometric problems associated with this handedness in superposition systems. In this application we uncover a solution to superpose the images modulated by identical MEMSs which have their mirror deflection axes oriented parallel to an axis of symmetry of the image raster of the MEMSs.

18 Claims, 6 Drawing Sheets

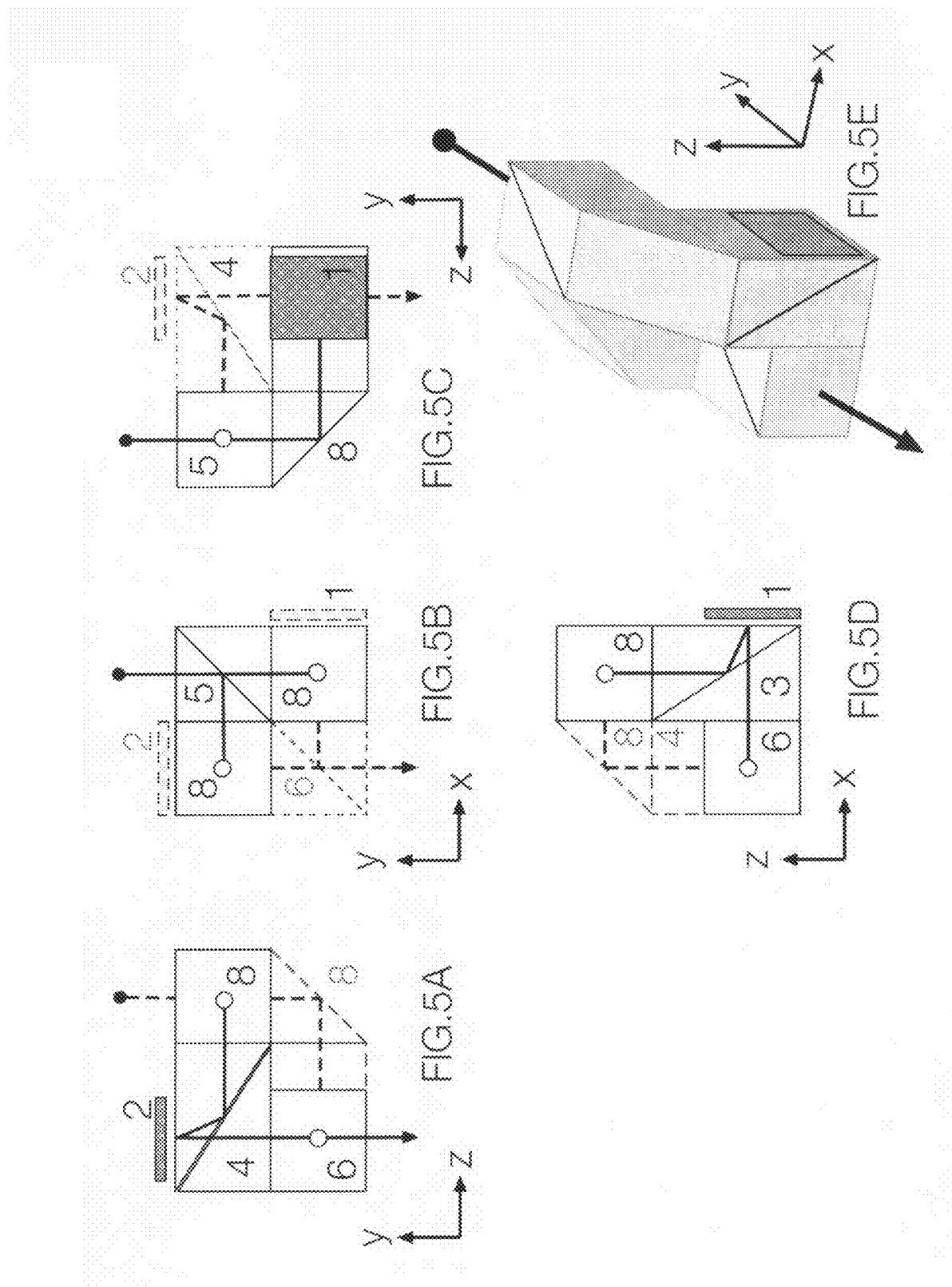

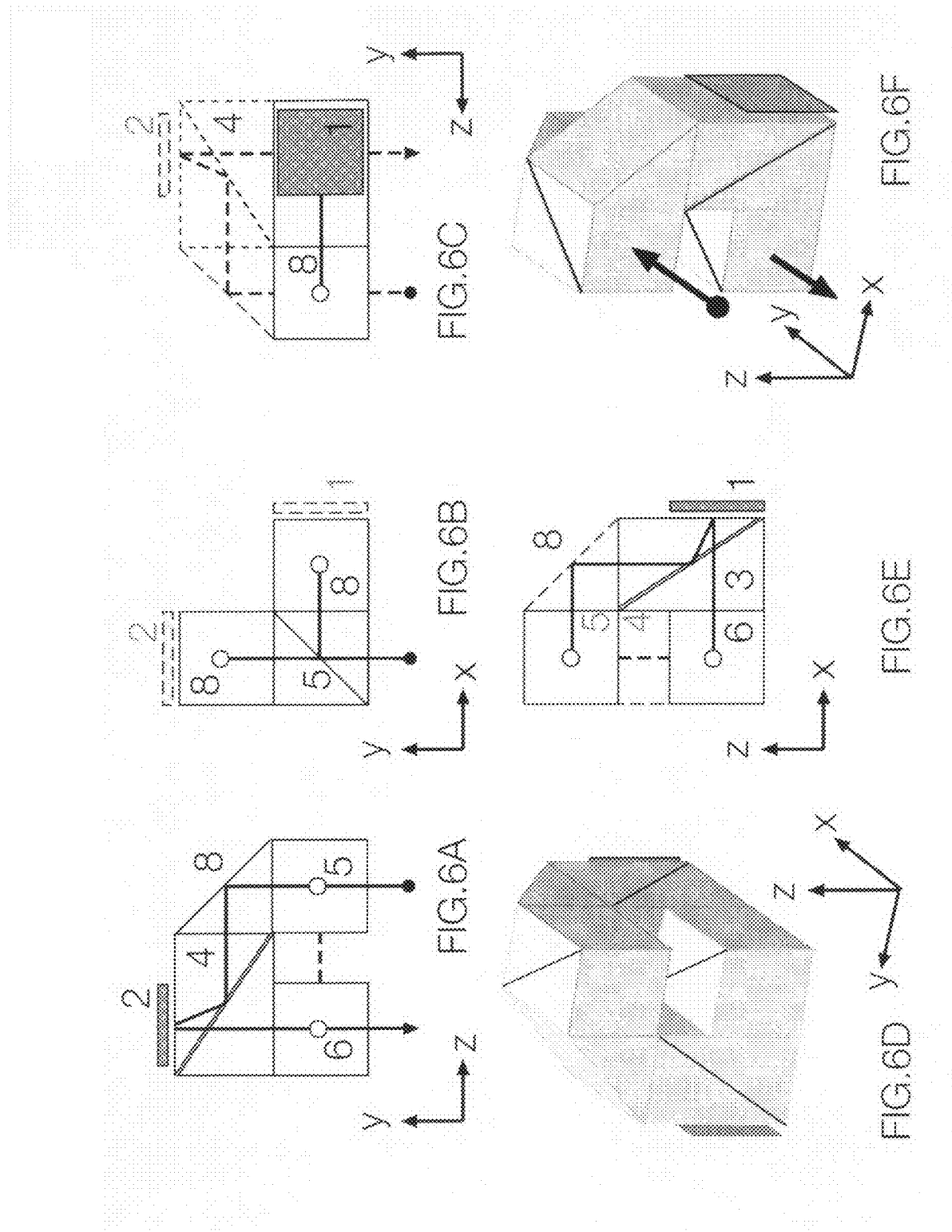

US 7,817,329 B2

2-CHANNEL DISPLAY SYSTEM COMPRISING MICRO ELECTRO MECHANICAL SYSTEMS

This is a divisional application of patent application U.S. Ser. No. 11/017,916 published Dec. 20, 2004 as US2005/0141076 now U.S. Pat. No. 7,440,768.

CROSS-REFERENCE TO RELATED APPLICATIONS

2-Channel Display System Comprising Micro Electro Mechanical Systems U.S. Ser. No. 11/017,916

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention uncovers a two channel stereo display, which simultaneously generates a right and left image in discrete modulation channels, which differ by the polarization of their light beams. The invention relates to display and projection systems using micro electro mechanical systems (MEMS) as displays. More specifically, the invention relates to the chirality (handedness) of deflectable micro mirror devices (DMD) caused by the orientation of their mirror deflection axes and uncovers solutions for MEMSs which have their mirror deflection axes oriented parallel to a symmetry axis of the image raster of the MEMS.

A polarization coded 2 channel stereo display system requires two spatially separated and different linearly polarized light beams which are simultaneously modulated by at least two SLMs upstream to the superposition system (polarization combiner). When two polarized beams are combined, one light beam ("S" polarized light) is folded into the other ("P" polarized light), the direction of which remains unchanged. This is common to all polarization combiners (PBS, e.g. MacNeille beam splitters; wire grid polarizers WGP, Moxtek Inc, UT, USA). The folding corresponds to an image reflection. As the modulation task of the SLMs takes place upstream of the superposition and only one beam is reflected (mirrored), one of the two SLMs has to create the reflected image. This can easily be achieved for liquid crystal SLMs by mirror symmetrically addressing the modulators of the two channels. Light is incident on these LC modulators with an incidence angle of 0° (perpendicular to the surface of the modulator). Light paths therefore are not influenced by rotation or mirroring.

Obviously MEMSs can also be addressed mirror symmetrically. However MEMSs of the state of the art (e.g. DMDs by Texas Instruments) do not show any axes of symmetry considering their overall operation. Only the "On" beam is reflected perpendicular to the modulator surface. The incident beam however is directed perpendicular to the mirror deflection axis (MDA), which is rotated by 45° to the image raster. It also reaches the display under an incidence angle of twice the deflection angle of a single mirror (FIG. 1). Thus, with a single DMD type as described no symmetrical light paths are possible.

A DMD with a 3×4 matrix is shown in FIG. 2A (this corresponds to the predominant width/height ratio of 4/3). Single mirrors (17) rotate around a deflection axis which is has an angle of 45° relative to the raster image. In FIG. 2B the single mirror deflection axes are visible after "removing" the mirrors. The center DMD corresponds to the state of the art type from Texas Instruments (U.S. Pat. No. 5,600,383). While the raster image shows internal symmetry, this is no longer the case if the orientation of the mirror deflection axis is taken into account. For overall operation no internal symmetry exists. After any mirroring (only horizontal and vertical mirroring is shown) this central "L" topology is converted into a single "R" topology. Due to their rectangular shape and to the orientation of the mirror deflection axes, which are rotated 45° to the image raster, these MEMS show stereo isomery. Stereo isomery is characterized by the existence of two different topologies which are mirror symmetric and cannot be transformed into each other by rotation.

In the prior art, when more than one MEMS is used (e.g. color generation in 3-chip designs) the second stereo-isomeric type is optically mimicked by using an additional reflection surface. This results either in equalizing the number of reflections downstream the MEMSs (e.g. Kavanagh et al., U.S. Pat. No. 5,638,142) or having an even-numbered difference of the number of reflections downstream the MEMSs (e.g. Fielding et al., U.S. Pat. No. 6,250,763). This was enforced by using the same physical layer for splitting and combining the input and ON-beams. In these arrangements, the mirror deflection axes of the single mirrors of all MEMSs are coplanar to the plane of superposition.

In our application U.S. Ser. No. 11/017,916 we have uncoupled split and combine systems (e.g. FIG. 3), and uncovered new solutions all without the additional reflection surface needed in the prior art mentioned above: this can be realized e.g. by coupling stereo-isomeric pairs of MEMSs resulting in mirror symmetric efficient light paths (US 2005 0141076) or by coupling two identical types of a stereo isomeric MEMS at the cost of symmetric light guidance (US 2007 0159680). In this application we focus on a solution where again a single type of MEMS is used without sacrificing the symmetry of light guidance: these MEMSs have their MDAs oriented parallel to an axis of symmetry of their image raster. These MEMSs are internally symmetrical with respect to the mirror deflection axis and image raster.

BRIEF SUMMARY OF THE INVENTION

FIG. 3 shows the first embodiment of this application (stereo wings with internally symmetric MEMSs). The light paths and basic operational features of this embodiment are explained in FIG. 4. A single type of MEMS is used for both image modulators (1,2), which are internally symmetric. Light (11) is polarized (e.g. by the PBS 5) and the two polarized sub-beams are guided via TIRs (3,4) to the MEMSs in each channel (13,14). The superposed image (22) shows that the virtually projected mirror deflection axes (21) of the two MEMSs (1,2) are parallel and that a complete overlap of the two corresponding images is possible. The light paths are mirror symmetric relative to the polarization effective layers of the beam splitter (6). FIGS. 3-6 show embodiments of our invention using minimal and effective light paths which are mirror symmetric relative to the polarization effective layers of the beam splitters (5) and (6) and which use MEMSs which are symmetric with respect to MDA and image raster.

BRIEF DESCRIPTION OF THE SEVERAL VIEWS OF THE DRAWING

FIG. 5 shows a second embodiment of the invention, an arrangement of beam splitters and TIRs with symmetric light paths, folded channels and internally symmetric MEMSs (folded stereo wings).

FIG. 6 shows a third embodiment of the invention, an arrangement of beam splitters and TIRs with symmetric light paths, folded channels, internally symmetric MEMSs and stacked beam splitter and combiner (stacked stereo wings).

DETAILED DESCRIPTION OF THE INVENTION

Figure 1:
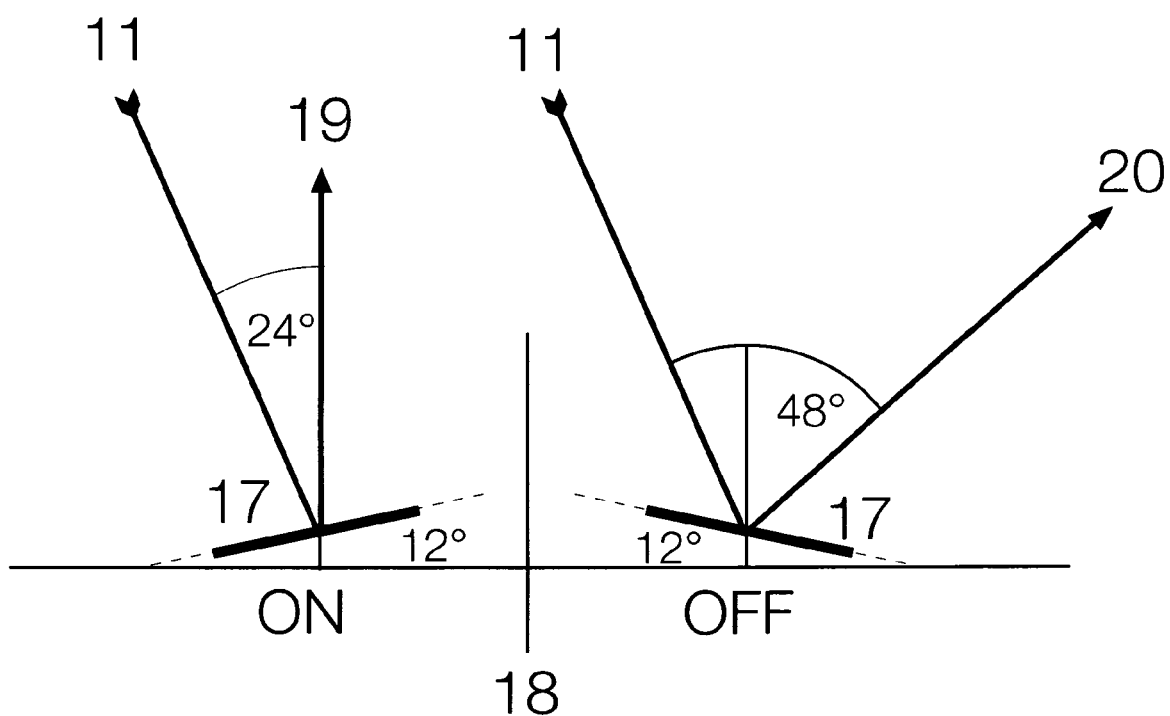
FIG. 1 is a schematic diagram illustrating the operation of a MEMS (DMD).
Figure 2A:
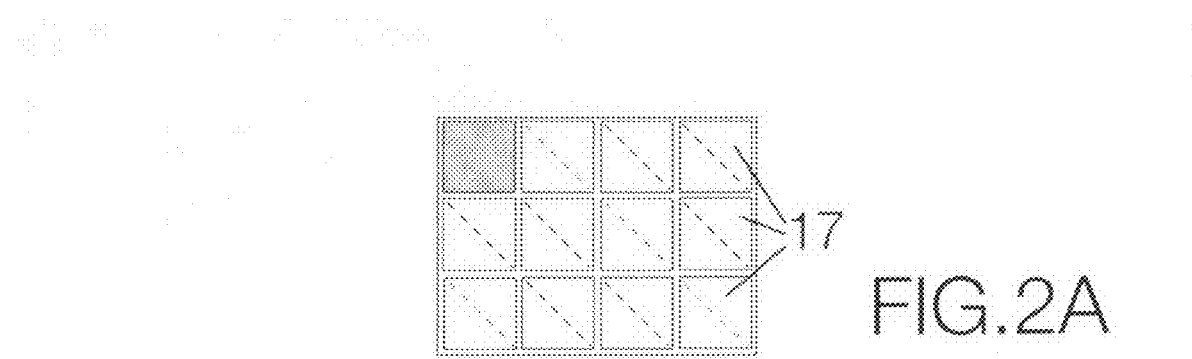
FIG. 2 shows the stereo-isomeric topology of MEMS according to the state of the art.
Figure 2B:
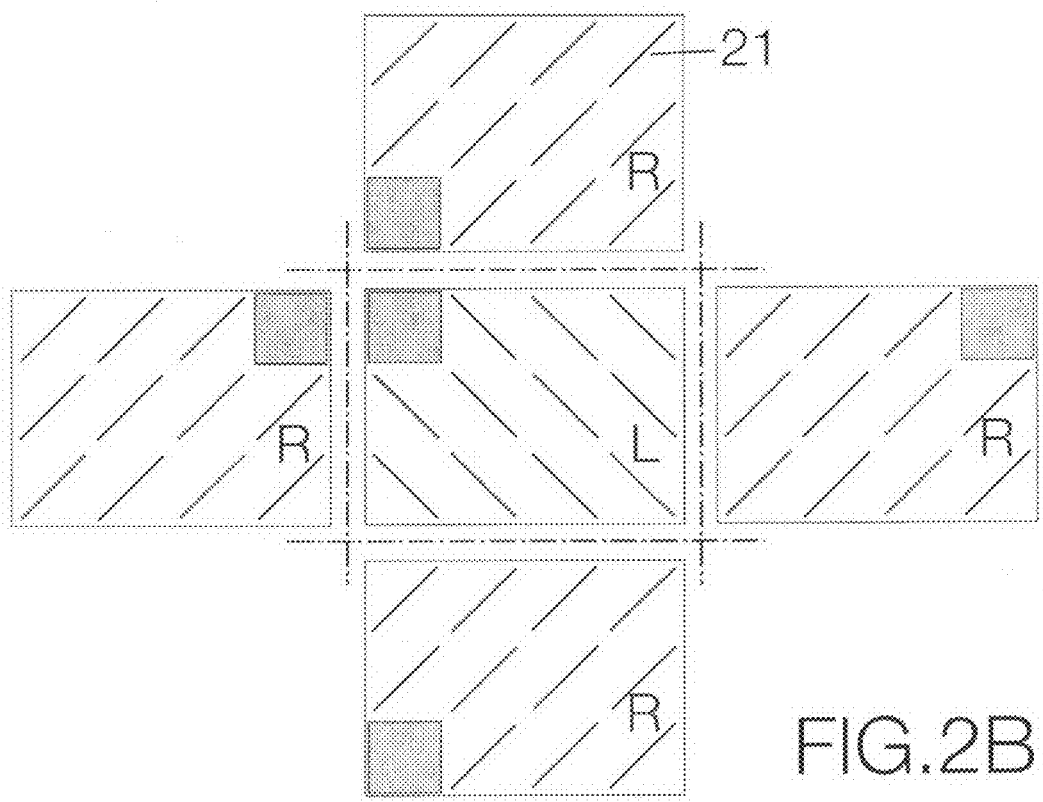
Figure 3:
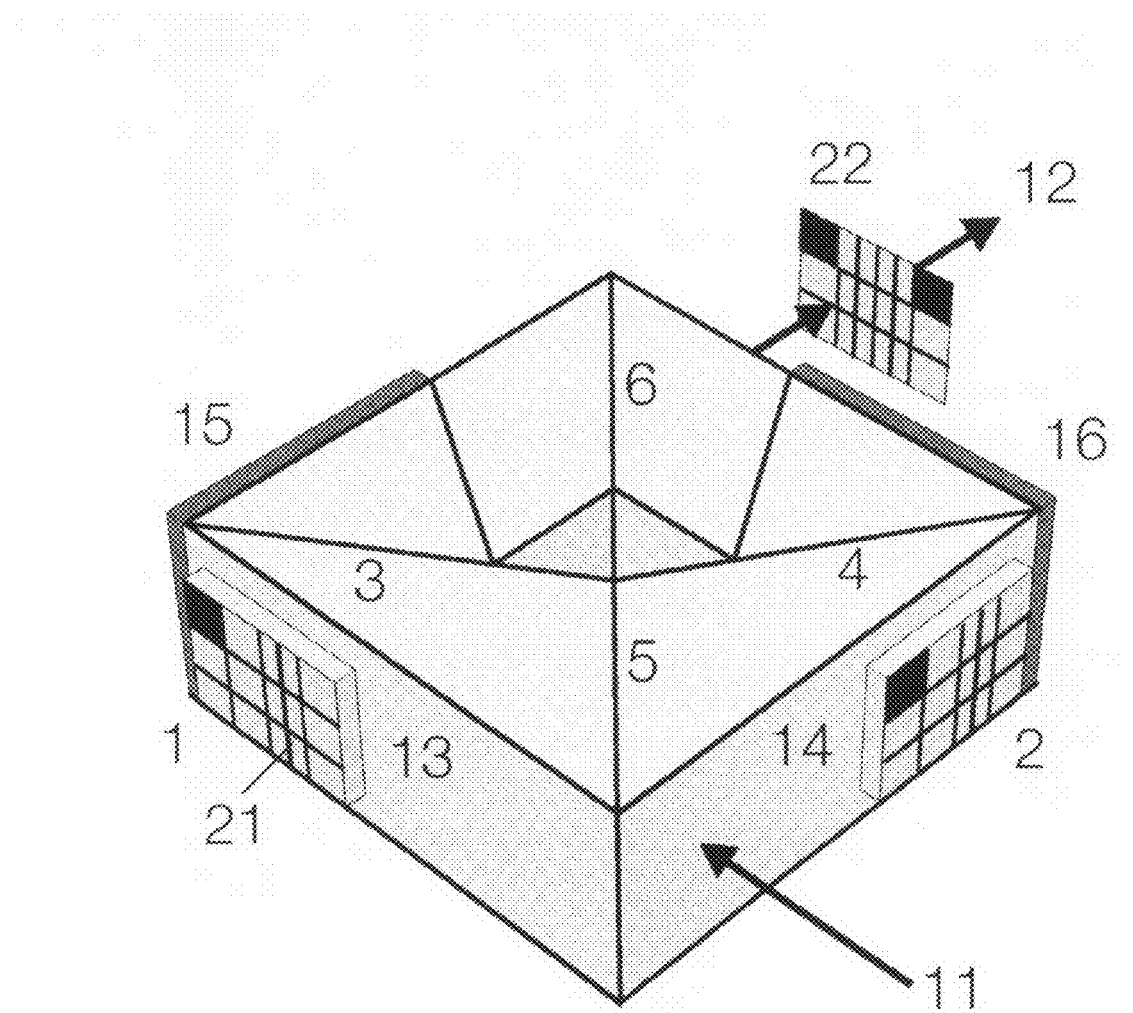
FIG. 3 shows a first embodiment of the invention, an arrangement of beam splitters and TIRs with mirror-symmetric light paths, and two MEMS modulators which show internal symmetry (stereo wings with internally symmetric MEMSs).

For the sake of simplicity the figures are labeled in a way that identical numbers indicate identical components in all figures. MEMS 1 (1); MEMS 2 (2); TIR 1 (3); TIR 2 (4); PBS 1 (5); PBS 2 (6); deflection mirror or TIR (8); cleanup polarizer for "S"-light (9); cleanup polarizer for "P"-light (10); incident beam (11); superimposed "On"beam (12); channel 1 (13); channel 2 (14); dump: "Off-light" channel 1 (15); dump: "Off-light" channel 2 (16); single deflectable mirror (17); normal (18); "On"-beam (19); "Off"-beam (20); mirror deflection axis (21); superimposed image (22); polarization conversion system PCS (25). In FIGS. 5,6 a small circle marks positions where a light beam is deflected in a direction perpendicular to the drawing plane.

Figure 4B:
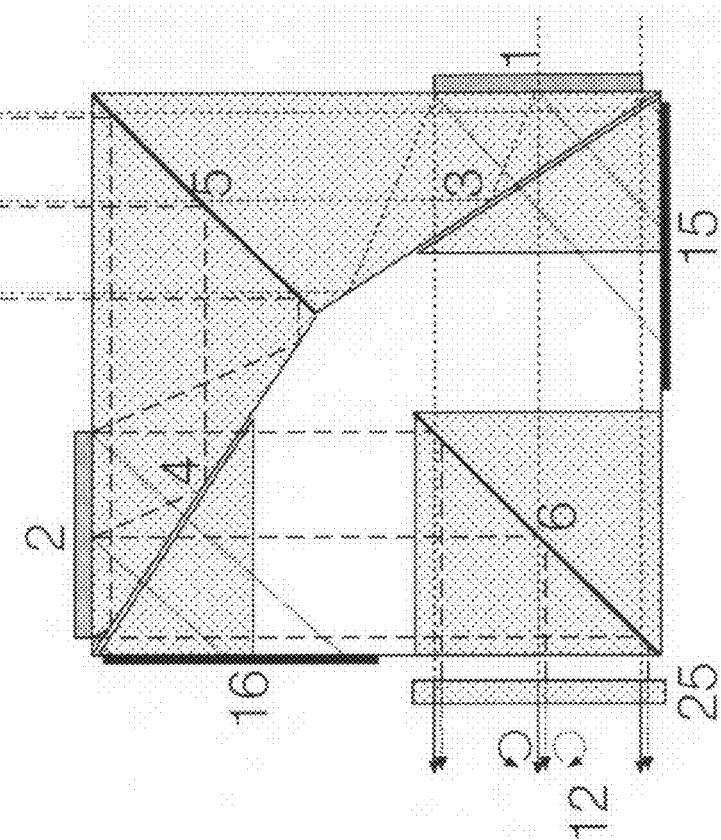
FIG. 4 shows how the light is guided in the first embodiment of the invention, the stereo wings arrangement of FIG. 3.
Figure 4A:
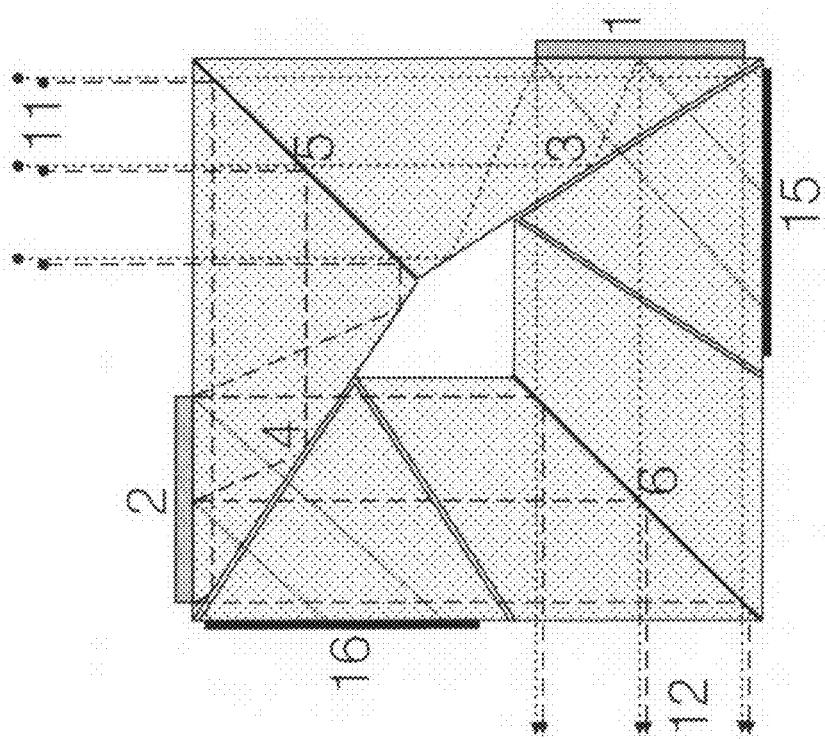

FIG. 4 shows the operational features of the first embodiment of the invention. Light beams emitted by a light source are directed to a first beam splitter (5) which splits the incident light (11) into two spatially separated and linearly polarized beams ("S" and "P" polarization states are indicated by stippled and dashed lines), resulting in two simultaneously modulated channels. It is appreciated that while the drawing shows a perpendicular angle between the two channels resulting from the use of a MacNeill type PBS, other angles between the channels are possible if other types of beam splitters and incidence angels are used for beam splitting and/or beam combining (e.g. wire grid polarizers WGP). Both polarized beams are then directed onto two spatial light modulators (1,2, SLMs, e.g. DMDs) in two functionally identical modules, which are arranged mirror symmetrically, and which comprise a total internal reflection prism (TIR) each (3, resp. 4). The said SLMs, shown are DMDs, modulate the incident beam (11) by a different mirror deflection in the "On" versus the "Off" state of a pixel. "On" pixel light is reflected in the normal of the DMD-surface. Modulated "ON" beams are recombined in a second beam splitter element (6). In both channels, light paths are arranged such that the plane of incidence (T1$_{POI}$, resp. T2$_{POI}$), which is spanned by incident and reflected beam of the TIR, is parallel to the plane of incidence (P2$_{POI}$), which is spanned by the two incident beams of the PBS (6). A polarization "impurity" (e.g. 5% "P" polarization in the "S" beam), which results in a regular beam splitter, will be largely removed in the second beam splitter element by the impurities leaving the system in a different direction than the superimposed beam. Thus, a spatial or functional separation of polarization beam splitter and polarization beam combiner will lead to substantially improved channel separation of the two stereo channels—this reduces "ghosting" (e.g. "P" light in the "S" beam) by a factor of 20 (in the case of MacNeill type PBS), overall channel separation will increase to 400:1. It is appreciated that channel separation, in accordance with our invention, can further be improved by additional cleanup polarizers. FIG. 4A shows a wing-like symmetrical arrangement of the two channels, which is described by our term "stereo wings". As is shown in FIG. 4A, the embodiment can be used with additional dumps to absorb the "Off" beams, or, as is shown in FIG. 4B, without dump in the modules. In FIG. 4B downstream of the superposition splitter, a polarization conversion system (25) is attached to the stereo wings (e.g. an achromatic quarter wave plate). In combination with adapted passive stereo goggles for circularly polarized light, the observer may rotate his/her head around the roll axis without influence on channel separation.

FIG. 5 shows the second embodiment of our invention which is derived by the folding of the wings in FIG. 4 (folded stereo wings). Both TIRs are rotated by 90°, the folding is accomplished by two deflection mirrors (8), which connect the output of the polarization splitter (5) to the rotated TIRs. The light path in the two channels is directed such that T$_{POI}$ is now perpendicular to P$_{POI}$. The arrangement shown in FIG. 5 may be advantageous when a back focal length (optical length between modulators and projection lens) of minimal size is required. FIG. 5 shows this embodiment in a top view (FIG. 5B), three side views (FIGS. 5A,C,D) and an isometric scheme (FIG. 5E). Beams in the uppermost layers of the views are shown in solid lines, while a dashed line indicates beams in lower planes. Optical axes perpendicular to the drawing plane (paper plane) are indicated by a small circle. In FIG. 5E, the input splitter PBS (5) in the top of the arrangement, the combiner PBS (6) at the bottom of the arrangement, and both TIRs (3 and 4) are indicated as well as the two 90° deflectance mirrors (8). FIG. 5B shows a top view (xy-plane) in which the incident light (black filled circle) is obvious. This incident light beam is then split by the input PBS (5) into two differently polarized light beams, which are deflected by the mirrors (8) to the bottom layer. FIG. 5E also shows the superposition PBS (6) in the bottom layer, and superimposed beam (arrow head) leaving the module in the same direction as the input beam enters it. In a side view FIG. 5C shows the light path of channel 1 from the polarizing beam splitter (5) via the 90° mirror (8) in direction of MEMS (1). In another side view FIG. 5D shows the further light path through TIR (3) to MEMS (1) and the "ON" beam from the modulator to the superposition PBS (6). FIG. 5A shows, in a corresponding side view, the light path of the second channel.

FIG. 6 shows a third embodiment of the invention (stacked stereo wings). This drawing is to be read analogous to FIG. 5. In contrast to the second embodiment, the PBS for splitting (5) and recombining (6) the light are arranged in a stacked position. It is appreciated that both systems could also be realized with a single, larger PBS. Input and output beam are also arranged on top of each other. FIG. 6D and FIG. 6F are isometric drawings from different points of view. FIG. 6B is a top view, and FIGS. 6A,C,E are side views.

A minimum projective display system in accordance to our invention may comprise at least one light source, means for sequential color generation, integrating means for homogenizing light, our 2 channel image display system core with two MEMSs, and a projection lens. Sequential color generation may be realized by a color wheel (e.g. Sequential Color Recapture SCR or color wheel, e.g. from Optical Coating Laboratory Inc, OCLI, CA, USA or a "High efficiency field sequential color wheel" after U.S. Pat. No. 5,921,650). In contrast to these mechanically color switching methods, sequential color generation could also be realized by electronically switching color systems (e.g. ColorSwitch from ColorLink, CO, USA) or similar systems.

Our embodiments are, however, also suitable for highest quality systems with simultaneous color generation (e.g., three MEMSs in each channel).

It will be appreciated that whilst this invention is described by way of detailed embodiments, these realizations serve as illustrations of the invention but not as a limitation of the invention; numerous variations in form and detail can be deduced by those skilled in the art or science to which the invention pertains without leaving the scope of the invention as defined by the following claims:

The invention claimed is:

1. A 2-channel display system comprising
   two spatially separate channels, simultaneously feeding two polarization coded images into a common light path out of which said images may be separated by a polarization decoding system;
   unpolarized light of at least one light source, comprising at least 3 spectral components, which are sufficient to span a color space;
   a polarization split system $PBS_1$ with a plane of incidence $P1_{POI}$ simultaneously generating two spatially separated light beams of a different linear polarization feeding the two channels;
   SLMs (spatial light modulators) of the MEMS type (Micro Electro Mechanical System), at least one in each channel, characterized by modulating light via the direction of the reflection of the incident light beam;
   MEMSs positioned such that the axis of the incident light beam differs from the axis of the modulated "ON"-light beam, the modulated "ON"-beam being reflected normal to the MEMS surface;
   a polarization combining system $PBS_2$ with a plane of incidence $P2_{POI}$ for superimposing the two spatially modulated "ON"-light beams of each channel into a common "ON"-light beam, the polarization combining system being spatially separated from the polarization split system;
   means for folding the light paths in both channels, at least 1 in each channel, additional to the reflection of the MEMS, and additional to the folding in said PBSs, with planes of incidence $T1_{POI}$ in one channel and $T2_{POI}$ in the second channel, positioned between polarization split system and polarization combining system;
   said means for folding coupled to said polarization combining system such that the cutting angle γ1 between $T1_{POI}$ and $P2_{POI}$ and the cutting angle γ2 between $T2_{POI}$ and $P2_{POI}$ are γ1=±γ2 (|γ1|=|γ2|), with $-90° < γ1, γ2 <= 90°$;
   means to control the mirror arrays of the MEMSs in both channels independently from each other;
   MEMSs rotated so that the mirror deflection axes of the MEMSs of the two channels are parallel in their virtual projection in the superposition image;
   MEMSs characterized by having internal symmetry (at least one axis of symmetry of the raster image is parallel or perpendicular to the deflection axis of the single mirror).

2. A 2-channel display system comprising
   two spatially separate channels, simultaneously feeding two polarization coded images into a common light path out of which said images may be separated by a polarization decoding system;
   unpolarized light of at least one light source, comprising at least 3 spectral components, which are sufficient to span a color space;
   polarization conversion systems, generating two spatially separated light beams of a different linear polarization feeding the two channels;
   SLMs (spatial light modulators) of the MEMS type (Micro Electro Mechanical System), at least one in each channel, characterized by modulating light via the direction of the reflection of the incident light beam;
   MEMSs positioned such that the axis of the incident light beam differs from the axis of the modulated "ON"-light beam, the modulated "ON"-beam being reflected normal to the MEMS surface;
   a polarization combining system $PBS_2$ with a plane of incidence $P2_{POI}$ for superimposing the two spatially modulated "ON"-light beams of each channel into a common "ON"-light beam, the polarization combining system being spatially separated from the polarization conversion systems;
   means for folding the light paths in both channels, at least 1 in each channel, additional to the reflection of the MEMS, and additional to the folding in said PBSs, with planes of incidence $T1_{POI}$ in one channel and $T2_{POI}$ in the second channel, positioned between polarization conversion systems and polarization combining system;
   said means for folding coupled to said polarization combining system such that the cutting angle γ1 between $T1_{POI}$ and $P2_{POI}$ and the cutting angle γ2 between $T2_{POI}$ and $P2_{POI}$ are γ1=±γ2 (|γ1|=|γ2|), with $-90° < γ1, γ2 <= 90°$;
   means to control the mirror arrays of the MEMSs in both channels independently from each other;
   MEMSs rotated so that the mirror deflection axes of the MEMSs of the two channels are parallel in their virtual projection in the superposition image;
   MEMSs characterized by having internal symmetry (at least one axis of symmetry of the raster image is parallel or perpendicular to the deflection axis of the single mirror).

3. A 2-channel display system according to claim 1 in which the means for folding the light paths in both channels are total internal reflection prisms (TIRs), positioned upstream to the polarization combining system.

4. A 2-channel display system according to claim 2 in which the means for folding the light paths in both channels are total internal reflection prisms (TIRs), positioned upstream to the polarization combining system.

5. A 2-channel display system according to claim 1 using a polarization conversion system transforming the linearly polarized light into circularly polarized light, one channel comprising left-handed, the other right-handed circular polarization.

6. A 2-channel display system according to claim 2 using a polarization conversion system transforming the linearly polarized light into circularly polarized light, one channel comprising left-handed, the other right-handed circular polarization.

7. A 2-channel display system according to claim 1 using polarization correction systems upstream to the superposition.

8. A 2-channel display system according to claim 2 using polarization correction systems upstream to the superposition.

9. A 2-channel display system according to claim 1 using stereoscopic information to control the MEMSs of the two channels.

10. A 2-channel display system according to claim 2 using stereoscopic information to control the MEMSs of the two channels.

11. A 2-channel display system according to claim 1 comprising
   a body;
   means to generate colors sequentially;
   one MEMS display in each channel;
   a projection lens.

12. A 2-channel display system according to claim 2 comprising
   a body;
   means to generate colors sequentially;
   one MEMS display in each channel;
   a projection lens.

13. A 2-channel display system according to claim 1 comprising
   a body;
   means to generate colors simultaneously;
   more than one MEMS display in each channel;
   a projection lens.

14. A 2-channel display system according to claim 2 comprising
   a body;
   means to generate colors simultaneously;
   more than one MEMS display in each channel;
   a projection lens.

15. A 2-channel display system according to claim 3 with said $P1_{POI}$, $P2_{POI}$, $T1_{POI}$, $T2_{POI}$ being all in one plane.

16. A 2-channel display system according to claim 3 with said planes $P1_{POI}$, $P2_{POI}$ being parallel, $T1_{POI}$, $T2_{POI}$ being perpendicular, and the $P_{POI}$s being perpendicular to either $T_{POI}$.

17. A method of using a 2-channel display system as claimed in claim 1.

18. A method of using a 2-channel display system as claimed in claim 2.

* * * * *